United States Patent [19]

Goebel

[11] 4,447,504
[45] May 8, 1984

[54] ELECTROCHEMICAL CELL WITH TWO RATE BATTERY STACKS

[75] Inventor: Franz Goebel, Sudbury, Mass.

[73] Assignee: GTE Products Corporation, Stamford, Conn.

[21] Appl. No.: 455,090

[22] Filed: Jan. 3, 1983

[51] Int. Cl.³ .................... H01M 12/00; H01M 4/36; H01M 2/02; H01M 2/08
[52] U.S. Cl. .................................. 429/9; 429/101; 429/178; 429/180
[58] Field of Search .............. 429/101, 152, 153, 157, 429/162, 196, 178–180, 9

[56] References Cited

U.S. PATENT DOCUMENTS

| | | | |
|---|---|---|---|
| 2,616,937 | 11/1952 | Kullgren | 429/9 X |
| 2,798,895 | 7/1959 | Nowotny | 429/162 |
| 3,200,014 | 8/1965 | Roberts | 429/9 |
| 3,347,709 | 10/1967 | Taylor et al. | 429/153 |
| 4,283,470 | 8/1981 | Freeman | 429/153 X |

Primary Examiner—Brian E. Hearn
Assistant Examiner—Stephen J. Kalafut
Attorney, Agent, or Firm—David M. Keay; Peter Xiarhos

[57] ABSTRACT

A primary electrochemical cell capable of selective operation at one of several possible discharge rates. The electrochemical cell in accordance with the present invention includes a pair of battery stacks positioned one above the other in a housing of the cell in a spaced-apart relationship. One of the battery stacks includes a first plurality of anode structures of first thicknesses and a first plurality of carbon electrode structures of first thicknesses arranged in alternation with the first plurality of anode structures. Similarly, the other battery stack includes a second plurality of anode structures of second thicknesses and a second plurality of carbon electrode structures of second thicknesses arranged in alternation with the second plurality of anode structures. The relative thicknesses of the abovementioned components of the two stacks, together with the number of components in the two stacks, can be controlled so as to achieve different discharge rates and durations of discharge of the cell at the different rates. The battery stacks may be operated during discharge either individually or together to achieve three possible discharge rates for the cell.

11 Claims, 3 Drawing Figures

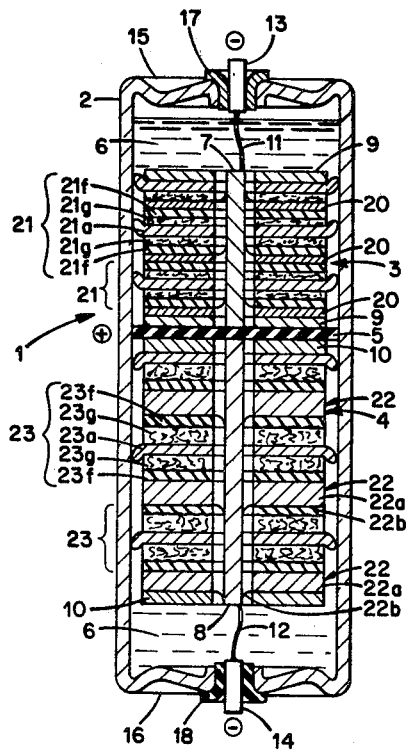

ELECTROCHEMICAL CELL WITH TWO RATE-BATTERY STACKS

CROSS-REFERENCE TO RELATED APPLICATIONS

In co-pending application Ser. No. 455,088, filed concurrently herewith in the names of Franz Goebel, William C. Melvin and William C. Van Schalkwyk and entitled "ELECTROCHEMICAL CELL," there is disclosed and claimed a cylindrical primary electrochemical cell capable of operation at successive high and low rates of discharge.

In co-pending application Ser. No. 455,089, filed concurrently herewith in the name of Franz Goebel and entitled "METHOD FOR ASSEMBLING AN ELECTROCHEMICAL CELL," there is disclosed and claimed a method for assembling a cylindrical primary electrochemical cell as disclosed in the present application.

FIELD OF THE INVENTION

The present invention relates to an electrochemical cell and, more particularly, to a primary electrochemical cell capable of selective operation at one or more of several possible discharge rates.

BACKGROUND OF THE INVENTION

There are many applications in which it is desirable to utilize a single primary electrochemical cell, such as a cylindrical electrochemical cell, which is capable of operating at one of several different discharge rates, for example, at one of three different discharge rates. It may also be a requirement that the cell operate at very low temperatures, for example, down to $-40°$ C. A typical application for a cell of the above character might utilize the different values of output voltages corresponding to the different discharge rates to power one or more loads on a selective basis.

Electrochemical cells capable of high-rate (greater than 1 mA/cm$^2$), low-temperature (to $-40°$ C.) operation have been described in detail in U.S. Pat. No. 4,284,691, in the names of Franz Goebel and William T. McHugh, and in U.S. Pat. No. 4,309,819, in the name of Franz Goebel. In each of these patents, a cylindrical electrochemical cell is described including a battery stack disposed within a cylindrical metal housing of the cell together with an electrolytic solution. The battery stack comprises a large number of generally circular, annular-shaped electrode components superimposed on each other in a single vertical stacked array relative to the housing and relative to a central, elongated, cylindrical, metal terminal member which extends completely through the battery stack and is encircled by the battery stack components. The components of the battery stack include a plurality of anode structures and a plurality of carbon current electrode/separator assemblies arranged in the array in alternation with the anode structures. Each of the anode structures includes a metal disc, for example, of lithium, and a contact member secured to the disc and in physical and electrical contact with both the disc and the central terminal member. Each of the carbon current collector electrode/separator assemblies includes a pair of carbon/fiberglass cathode structures physically adjacent to opposite sides of a metal (e.g., nickel) current collector disc. These latter components have central openings of a size to space, or electrically isolate, the components from the central terminal member. The current collector disc is of a size and configuration so as to make direct physical and electrical contact with the interior wall of the housing of the cell.

The electrochemical cells as briefly described hereinabove and in the aforementioned patents are highly suitable for a wide range of applications requiring high-current drain, low-temperature operation. However, each of the cells as described in the patents is capable of operating within a narrow range of discharge rates. Thus, if a particular application requires the availability of several different selective discharge rates, a cell as described in the aforementioned patents does not satisfy this requirement.

BRIEF SUMMARY OF THE INVENTION

In accordance with the present invention, an electrochemical cell is provided which offers capabilities lacking in prior art electrochemical cells as described hereinabove.

The electrochemical cell in accordance with the present invention includes an elongated metal housing and an electrochemical system contained within the housing. The electrochemical system includes an electrolytic solution and a plurality of battery stack components exposed to the electrolytic solution and arranged in first and second battery stacks. The first and second battery stacks are arranged to respectively encircle first and second spaced-apart elongated metal terminals provided within and along the direction of the housing. The two stacks and their associated metal terminals are spaced apart from each other within the housing.

The first battery stack as utilized within the cell comprises a first plurality of metal electrode structures and a first plurality of carbon electrode structures. The first plurality of metal electrode structures are of first thicknesses and are in direct physical contact with the first elongated metal terminal and spaced from an interior wall of the housing. The first plurality of carbon electrode structures are of first thicknesses and are arranged in alternation with the first plurality of metal electrode structures. These carbon electrode structures are in direct physical contact with the interior wall of the housing and are spaced from the first elongated metal terminal.

In a similar fashion as described hereinabove, the second battery stack as utilized within the cell comprises a second plurality of metal electrode structures and a second plurality of carbon electrode structures. The second plurality of metal electrode structures are of second thicknesses and are in direct physical contact with the second elongated metal terminal and spaced from the interior wall of the housing. The second plurality of carbon electrode structures are of second thicknesses and are arranged in alternation with the second plurality of metal electrode structures. These carbon electrode structures are in direct physical contact with the interior wall of the housing and are spaced from the second elongated metal terminal.

BRIEF DESCRIPTION OF THE DRAWING

In the drawing:

FIG. 1 is an elevated view, partly in cross section, of a primary electrochemical cell in accordance with the present invention;

FIGS. 2 and 3 are greatly enlarged top and cross sectional views, respectively, of an anode structure utilized by the electrochemical cell of FIG. 1; and FIGS. 4 and 5 are greatly enlarged top and cross sectional views, respectively, of a carbon current collector cathode/separator assembly utilized by the electrochemical cell of FIG. 1.

DETAILED DESCRIPTION OF THE INVENTION

Referring now to FIG. 1, there is shown a primary electrochemical cell 1 in accordance with the invention. The electrochemical cell 1 as shown in FIG. 1 generally includes an elongated, cylindrical metal case or housing 2, for example, of stainless steel, within which a pair of battery stacks 3 and 4 are disposed, one above the other, and insulated from each other at a central region by a suitable porous insulator 5, for example, of glass fiber or plastic. The housing 2 of the cell 1 further includes an electrolytic solution 6 in contact with the battery stacks 3 and 4. The electrolytic solution 6 may include a reducible soluble cathode such as thionyl chloride and an electrolyte solute such as lithium tetrachloroaluminate dissolved in the thionyl chloride.

Each of the battery stacks 3 and 4 comprises a large number of generally circular, annular-shaped electrode components superimposed on each other in a vertical stacked array as shown in FIG. 1. An elongated, cylindrical terminal member 7, for example, in the form of a metal (e.g., nickel) tube or rod, extends completely and centrally through the battery stack 3 and is surrounded by the electrode components of the stack 3. A similar terminal member 8 extends completely and centrally through the battery stack 4 and is surrounded by the electrode components of that stack. The electrode components of the two stacks 3 and 4 are retained in position by corresponding pairs of spaced-apart retainer plates 9 and 10, respectively, which are secured to opposing end regions of the respective terminal members 7 and 8 on opposite sides of the respective battery stacks 3 and 4. The retainer plates 9 and 10 are preferably of metal and may be secured to the terminal members in any suitable manner, as by welding. The diameters of the metal retaining plates are selected to be smaller than the internal diameter of the housing 2 so as to be electrically isolated from the housing 2. If the retainer plates 9 and 10 are of a material other than metal, for example, an electrically-nonconductive material such as plastic, the aforementioned insulator 5 between the stacks is unnecessary and the retainer plates may make direct (e.g., frictional) physical contact with the interior wall of the housing 2. In this case, however, the retainer plates should have openings therein (or otherwise be porous) for permitting bidirectional passage of the electrolytic solution 6 between the two portions of the housing 2 in which the battery stacks 3 and 4 are located.

The terminal members 7 and 8 as discussed hereinabove are connected at their outer exposed ends by respective metal jumper strips 11 and 12 to respective cylindrical, metal hollow feedthrough members 13 and 14. The metal jumper strips 11 and 12, which may be of nickel, are typically connected to, and between, the terminal members 7 and 8 and the feedthrough members 13 and 14 by spot welds. The feedthrough members 13 and 14 are insulated from respective hermetically-sealed end caps 15 and 16 of the cell 1 by way of respective standard glass or ceramic-to-metal seals 17 and 18. The terminal member 7, the jumper strip 11 and the feedthrough member 13 collectively represent a first negative electrical terminal of the cell 1, and, likewise, the terminal member 8, the jumper strip 12 and the feedthrough member 14 collectively represent a second negative electrical terminal of the cell 1. The metal housing 2 of the cell 1 serves as a common positive electrical terminal of the cell 1.

The battery stack 3 as mentioned hereinabove comprises a plurality of anode structures 20 and a plurality of carbon current collector cathode/separator assemblies 21 arranged in alternation with the anode structures 20. In similar fashion, the battery stack 4 comprises a plurality of anode structures 22 and a plurality of carbon current collector cathode/separator assemblies 23 arranged in alternation with the anode structures 22. The components of the two stacks 3 and 4 differ from each other principally in that the anode structures 20 of the stack 3 are thinner than the anode structures 22 of the stack 4 and, similarly, the carbon current collector cathode/separator assemblies 21 of the stack 3 are thinner than the cathode/separator assemblies 23 of the stack 4. The effect of the use in the stacks 3 and 4 of the anode structures and cathode/separator assemblies of different thicknesses is to provide a greater total surface area, and a consequential greater current drain capability (during discharge), for the stack 3 than for the stack 4. Typical values of thicknesses for the anode structures 20 and 22 are 0.01 inch and 0.06 inch, respectively, and typical values of thicknesses for the cathode/separator assemblies 21 and 23 are 0.02 inch and 0.10 inch, respectively. The diameters of the two anode structures 20 and 22 are the same and, similarly, the diameters of the two cathode/separator assemblies 21 and 23 are the same. The total number of electrode components in each of the stacks 3 or 4 is selected so as to achieve the desired time periods or durations of current drain for each of the stacks 3 and 4 during discharge of the cell 1, as will be explained more fully hereinafter.

The anode structures 20 and 22 of the two stacks 3 and 4, apart from being of different thicknesses as mentioned hereinabove, are of identical design and construction and, likewise, the cathode/separator assemblies 21 and 23, apart from being of different thicknesses as mentioned hereinabove, are also of identical design and construction. FIGS. 2 and 3 illustrate the details of one of the anode structures 20 as employed in the stack 3, and FIGS. 4 and 5 illustrate the details of one of the cathode/separator assemblies 21 as employed in the stack 3. The following discussion of the anode structure 20 and the cathode/separator assembly 21 also applies, but for the differences noted hereinabove, to the anode structures 22 and the cathode/separator assemblies 23 as used in the stack 4. For this reason, similar referencing nomenclature is used in FIG. 1 for the anode structures 22 and the cathode/separator assemblies 23 as used with the anode structure 20 shown in FIGS. 2 and 3 and the cathode/separator assembly 21 shown in FIGS. 4 and 5.

As indicated in FIGS. 2 and 3, each of the anode structures 20 comprises a flat, generally circular annular-shaped disc 20a, and a small cross-shaped contact member 20b secured to the disc 20a. A suitable material for the disc 20a for use within the cell 1 is an active oxidizable alkali metal, such as lithium, and a suitable thickness therefor is 0.01 inch. The cross-shaped contact member 20b, which may be of nickel of a thickness of 0.003 inch, is secured to the lithium anode disc 20a by means of several small tines or barbs 20c which are stamped into the arms thereof and which "bite" into the soft lithium metal for making physical and electrical contact therewith. The contact member 20b further has a plurality of resilient portions 20d which collectively define a cross-shaped opening 20e in the contact member 20b. This opening is aligned with a large central opening 20f (FIG. 3) in the lithium anode disc 20a. The opening 20e in the contact member 20b has a size as defined by the portions 20d so that the anode structure 20 can be assembled onto the associated terminal member 7 (which may have a diameter of 0.125 inch) by simply forcing the anode structure 20 over the top end of the terminal member 7 and sliding the anode structure 20 along the terminal member 7 to its proper position in the battery stack 3. When in its proper position in the stack, and as indicated in FIG. 1, the resilient portions 20d of the contact member 20b are deflected upwardly slightly and make direct physical and electrical contact with the terminal member 7. The sharp edges of the portions 20d bite into the terminal member 7 so as to secure the anode structure 20 in position. As indicated in FIG. 1, the diameter of each anode structure 20 is selected to be smaller than the internal diameter of the housing 2 of the cell 1 so as to prevent the anode structure 20 from making physical and electrical contact with the interior wall of the housing 2. A suitable diameter for the anode structure 20 is 0.90 inch. A typical internal diameter for the housing 2, corresponding to a C-size cell, is one inch.

Corresponding thickness dimensions for the anode structures 22 of the battery stack 4 are a thickness of 0.06 inch for the lithium anode discs 22a and 0.003 inch for the contact member 22b.

Each of the aforementioned carbon current collector cathode/separator assemblies 21 as shown in FIGS. 4 and 5 generally includes a circular, notched metal current collector substrate 21a, and a pair of integrated carbon/insulator structures 21b on opposite sides of the current collector substrate 21a. The integrated carbon/insulator structures 21b as shown in FIGS. 4 and 5 are not secured to the current collector substrate 21a but rather are only in direct physical contact with the substrate 21a when assembled into the cell 1. The current collector substrate 21a as employed in the cell 1 and shown in FIGS. 4 and 5 takes the form of a circular, flat disc of a metal such as nickel having a central opening 21c (FIG. 5) and a plurality of openings 21d in the form of curved notches spaced around its periphery at regular intervals and defining small arcuate peripheral portions 21e intermediate to the notches. The opening 21c in the substrate 21a is of a diameter greater than the diameter of the associated terminal member 7 so as to establish a spacing, and to be electrically isolated from, the terminal member 7 when the substrate 21a and the associated carbon/insulator structures 21b are assembled together into the cell 1. The notches 21d serve to establish multiple passageways by which the electrolytic solution 6 is able quickly and readily to fill void spaces in the cell and permeate porous components of the battery stack 3. In addition, the notches 21d enable the peripheral portions 21e to be deflected upwardly during assembly of the cell 1 whereby sharp edges of the portions 21e are able to bite into the interior wall of the housing 2 and, as indicated in FIG. 1, make direct physical and electrical contact with the wall of the housing 2 in numerous places. The diameter of the substrate 21a prior to insertion into the housing 2 is slightly greater than the internal diameter of the housing 2 so as to permit upward deflection of the arcuate portions 21e when the substrate 21a is inserted into the housing 2.

Each of the carbon/insulator structures 21b used with the above-described current collector substrate 21a comprises, as shown in FIG. 5, an arrangement of a porous insulator sheet or disc 21f physically and permanently integrated with a porous carbon layer or disc 21g. The porous insulator disc 21f is of an electrically-nonconductive material such as glass fiber and serves as a separator for electrically isolating the associated porous carbon disc 21g from an immediately adjacent one of the lithium anode structures 20. The porous carbon disc or layer 21g comprises an aggregation of porous globules or conglomerates containing carbon black and a binder such as "Teflon" and having a network of electrolyte-conducting channels formed throughout its entire mass for permitting the electrolytic solution 6 to permeate the layer 21g and the associated insulator disc 21f. For purposes of assembly within the cell 1, the porous insulator disc 21f and the porous carbon layer 21g have respective circular central openings 21h and 21i of the same size as, and aligned with, the opening 21c in the current collector substrate 21 for providing a space between these elements and the terminal member 7 when assembled within the cell 1.

The carbon/insulator structure 21b as described hereinabove is also described in detail, and claimed, in U.S. Pat. No. 4,296,187, in the names of John E. Barnes, Franz Goebel, and William T. McHugh. The current collector substrate 21a as described hereinabove is also described in detail, and claimed, in U.S. Pat. No. 4,315,060, in the names of Franz Goebel and William T. McHugh. Suitable thicknesses for the porous insulator disc 21f and the porous carbon layers 21g are 0.005 inch and 0.01 inch, respectively. A suitable thickness for the current collector substrate 21a is 0.003 inch. Suitable corresponding thickness dimensions for the cathode/separator assemblies 23 of the stack 4 are a thickness of 0.005 inch for the porous insulator discs 23f, a thickness of 0.05 inch for the porous carbon layers 23g, and a thickness of 0.003 inch for the current collector substrates 23a. From a comparison of the dimensions of the two types of cathode/separator assemblies 21 and 23, it will be noted that the current collector substrates 21a and 23a of the two cathode/separator assemblies are of the same thickness, and the porous insulator discs 21f and 23f are also of the same thickness.

With the various components of the battery stacks 3 and 4 arranged within the cell 1 as indicated in FIG. 1, the electrolytic solution 6, which is introduced into the cell 1 by way of either one of the feedthrough members 13 and 14, is readily able to diffuse the stack and permeate the porous components thereof. This latter action is facilitated by the aforedescribed numerous peripheral notches formed in the current collector substrates 21a and 23a and adjacent to the interior wall of the housing 2 and also by the spaces established between the components of the stacks and the interior wall of the housing 2 and the terminal members 7 and 8. The electrolytic solution 6 diffuses into the multiple carbon discs 21g and 23g by way of the network of electrolyte-conducting channels formed therein and also diffuses into the multiple porous insulator discs 21f and 23f.

The cell 1 as described hereinabove is capable of operation at any one of three possible discharge rates. When a load (not shown) is connected between the negative terminal (feedthrough) member 14 and the housing 2 (positive terminal), the cell 1 will discharge at a first rate and produce a first set of values of current drain and output voltage; when the load is connected between the negative terminal (feed-through) member 13 and the housing 2, the cell 1 will discharge at a second, higher, rate and produce a second, higher, set of values of current drain and output voltage; when the terminal members 13 and 14 are shorted together and the load is connected between both terminal members 13 and 14 and the housing 2, the cell 1 will discharge at a third rate and produce a third, and highest, set of values of current drain and output voltage. The three different rates of discharge of the cell 1 are determined by the total surface areas of the two battery stacks 3 and 4 which, in turn, are determined by the number and thicknesses of the anode structures (20 and 22) and cathode/separator assemblies (21 and 23) used in the stacks 3 and 4. In the present case, due to the thinner anode structures and cathode/separator assemblies used in the stack 3, this stack will discharge at a higher rate and produce a greater current drain and output voltage than the stack 4 which contains the thicker components. The durations of the possible discharge operations are determined by, and directly proportional to, the number of components used in the stacks 3 and 4. As is well understood, during any one of the discharge operations of the cell 1, the reducible soluble cathode in the electrolytic solution 6, namely, the thionyl chloride, is catalytically reduced at the surfaces of the multiple carbon discs of either one or both of the stacks 3 and 4 (depending on the selected mode of operation), and the lithium metal of the anode structures of either one or both of the stacks 3 and 4 is gradually and progressively depleted, starting from the outside edges of the anode structures and progressing toward the centers of the anode structures. The cell 1 is capable of satisfactory performance down to a temperature as low as $-40°$ C. The cell 1 may also be used with several loads, selectively connected to the cell in any suitable manner.

Although the cell 1 has been described hereinabove as utilizing anode structures 20 and 22 and other cell components of particular design and assembled into the cell in a specified manner (as taught in U.S. Pat. No. 4,284,691), it is to be appreciated that other designs of anode structures and other assembly techniques for assembling anode structures into a cell are possible. By way of example, alternative designs and assembly techniques for anode structures (and related cell components) are described in detail in U.S. Pat. No. 4,283,470, in the names of Franz Goebel and Roger K. Freeman, and in U.S. Pat. No. 4,309,819, in the name of Franz Goebel. It will be obvious to those skilled in the art that other changes and modifications may be made to cells as described hereinabove without departing from the invention as called for in the appended claims.

What is claimed is:

1. An electrochemical cell comprising:
    an elongated metal housing having first and second portions and an interior wall;
    first and second spaced-apart elongated metal terminals within and along the direction of the housing; and
    an electrochemical system contained within the housing and including an electrolytic solution within the housing with bi-directional passage between said first and second portions and a plurality of battery stack components exposed to the electrolytic solution and arranged in first and second battery stacks encircling the first and second elongated metal terminals, respectively, said first and second battery stacks and associated first and second elongated metal terminals being spaced apart from each other within the first and second portions, respectively, of the housing;
    said first battery stack within said first portion of the housing comprising:
        a first plurality of metal electrode structures of first thicknesses in direct physical contact with the first elongated metal terminal and spaced from the interior wall of the housing; and
        a first plurality of carbon electrode structures of first thicknesses arranged in alternation with the first plurality of metal electrode structures and in direct physical contact with the interior wall of the housing and spaced from the first elongated metal terminal; and
    said second battery stack within said second portion of the housing comprising:
        a second plurality of metal electrode structures of second thicknesses in direct physical contact with the second elongated metal terminal and spaced from the interior wall of the housing; and
        a second plurality of carbon electrode structures of second thicknesses arranged in alternation with the second plurality of metal electrode structures and in direct physical contact with the interior wall of the housing and spaced from the second elongated metal terminal;
    said housing including first and second electrical terminals supported therein and electrically insulated therefrom;
    first means electrically connecting the first elongated metal terminal with the first electrical terminal;
    second means electrically connecting the second elongated metal terminal with the second electrical terminal; and
    said metal housing serving as a common electrical terminal.

2. An electrochemical cell in accordance with claim 1, wherein:
    the first and second electrical terminals are located at opposite ends of said housing.

3. An electrochemical cell in accordance with claim 2, wherein:
    the first thicknesses of the first plurality of metal electrode structures are less than the second thicknesses of the second plurality of metal electrode structures; and
    the first thicknesses of the first plurality of carbon electrode structures are less than the second thicknesses of the second plurality of carbon electrode structures.

4. An electrochemical cell in accordance with claim 3, wherein:
    the first and second pluralities of metal electrode structures are anode structures, each including a metal disc physically secured to its associated first or second elongated metal terminal; and
    the metal discs of the first plurality of metal electrode structures have thicknesses less than the thicknesses of the metal discs of the second plurality of metal electrode structures.

5. An electrochemical cell in accordance with claim 4, wherein each of the first and second pluralities of carbon electrode structures comprises:

a metal substrate spaced from the associated first or second elongated metal terminal and in direct physical contact with the interior wall of the housing;

first and second carbon layers on opposite sides of, and in direct physical contact with, the metal substrate and spaced from the associated first or second elongated metal terminal, each of said porous carbon layers having a network of electrolyte-conducting channels therethrough for the receipt of, and to be permeated by, the electrolytic solution; and first and second porous insulators in direct physical contact with the first and second carbon layers, respectively, and in direct physical contact with adjacent metal electrode structures and separating the carbon layers from the adjacent metal electrode structures;

the porous carbon layers of the first plurality of carbon electrode structures having thicknesses less than the thicknesses of the porous carbon layers of the second plurality of carbon electrode structures.

6. An electrochemical cell in accordance with claim 4, wherein:

the metal disc of each anode structure is of an oxidizable alkali metal.

7. An electrochemical cell in accordance with claim 6, wherein:

the metal disc of each anode structure is a lithium disc.

8. An electrochemical cell in accordance with claim 7, wherein:

the electrolytic solution is a cathodelectrolyte solution including a reducible soluble cathode and an electrolyte solute dissolved in the reducible soluble cathode.

9. An electrochemical cell in accordance with claim 8, wherein:

the reducible soluble cathode of the cathodelectrolyte solution is thionyl chloride; and the electrolyte solute of the cathodelectrolyte solution is lithium tetrachloroaluminate.

10. An electrochemical cell in accordance with claim 9, further comprising:

insulator means electrically and physically separating the first and second battery stacks and their associated first and second elongated metal terminals from each other while permitting bi-directional passage of the electrolytic solution between the first and second portions of the housing.

11. An electrochemical cell in accordance with claim 10, further comprising:

a first pair of retaining members secured to the first elongated terminal at opposite ends of the first battery stack for retaining the components of the first battery stack in position within the housing of the cell; and a second pair of retaining members secured to the second elongated terminal at opposite ends of the second battery stack for retaining the components of the second battery stack in position within the housing of the cell.

* * * * *